United States Patent
Lee et al.

(10) Patent No.: US 10,655,773 B2
(45) Date of Patent: May 19, 2020

(54) STRUCTURE FOR FORMING FLUID PATH

(71) Applicant: MANDO CORPORATION, Gyeonggi-do (KR)

(72) Inventors: Chanhui Lee, Gyeonggi-do (KR); Youngsong Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 59 days.

(21) Appl. No.: 15/483,496

(22) Filed: Apr. 10, 2017

(65) Prior Publication Data
US 2017/0292619 A1   Oct. 12, 2017

(30) Foreign Application Priority Data
Apr. 8, 2016 (KR) .................. 10-2016-0043672

(51) Int. Cl.
*F16L 55/11* (2006.01)
*F16K 11/056* (2006.01)
(Continued)

(52) U.S. Cl.
CPC ......... *F16L 55/1133* (2013.01); *B60T 8/3675* (2013.01); *B60T 17/04* (2013.01);
(Continued)

(58) Field of Classification Search
CPC .... B60T 8/3675; B60T 17/04; F15B 13/0814; F15B 2013/006; Y10T 137/87885;
(Continued)

(56) References Cited

U.S. PATENT DOCUMENTS

| 7,004,145 B2 * | 2/2006 | Zander ................. F02M 55/005 123/456 |
| 10,006,558 B2 * | 6/2018 | Suematsu ........... F16K 31/0641 |
| 2015/0314760 A1 * | 11/2015 | Weh ........................ B60T 8/368 137/884 |

FOREIGN PATENT DOCUMENTS

| CN | 201517394 | 6/2010 |
| CN | 201715029 | 1/2011 |

(Continued)

OTHER PUBLICATIONS

Office Action ($2^{nd}$) dated Jun. 11, 2019 for Chinese Patent Application No. 201710229124.0 and its English machine translation by Global Dossier.
(Continued)

*Primary Examiner* — Atif H Chaudry
(74) *Attorney, Agent, or Firm* — Ladas & Parry, LLP

(57) ABSTRACT

A structure for forming a fluid path is provided. The structure for forming a fluid path according to one embodiment of the present disclosure includes a body configured with first and second fluid paths which communicate with each other, and a third fluid path which is provided at a position, at which the first and second fluid paths are connected to each other, and communicates with the first and second fluid paths, and includes one or more among a first ball which is able to be disposed in the first fluid path, a second ball which is able to be disposed in the second fluid path, and a third ball which is able to be disposed in the third fluid path, wherein a diameter of the first fluid path is greater than that of the second fluid path, and the second ball is able to be disposed in the second fluid path by passing the first fluid path.

13 Claims, 5 Drawing Sheets

(51) Int. Cl.
        *F16K 11/20*       (2006.01)
        *F15B 13/08*       (2006.01)
        *B60T 17/04*       (2006.01)
        *B60T 8/36*        (2006.01)
        *F16K 11/10*       (2006.01)
        *F15B 13/00*       (2006.01)

(52) U.S. Cl.
        CPC ........ *F15B 13/0814* (2013.01); *F16K 11/056* (2013.01); *F16K 11/10* (2013.01); *F16K 11/20* (2013.01); *F16L 55/1141* (2013.01); *F15B 2013/006* (2013.01); *Y10T 137/5283* (2015.04); *Y10T 137/87249* (2015.04); *Y10T 137/87885* (2015.04); *Y10T 137/9247* (2015.04)

(58) Field of Classification Search
        CPC ....... Y10T 137/9247; Y10T 137/87249; Y10T 137/5283; F16L 55/1133; F16L 55/1141
        See application file for complete search history.

(56) References Cited

FOREIGN PATENT DOCUMENTS

| | | |
|---|---|---|
| CN | 203335931 | 12/2013 |
| GB | 2449557 | 11/2008 |

OTHER PUBLICATIONS

Office Action (1st) dated Sep. 21, 2018 for Chinese Patent Application No. 201710229124.0 and its English machine translation by Google Translate.

\* cited by examiner

STRUCTURE FOR FORMING FLUID PATH

CROSS-REFERENCE TO RELATED APPLICATION

This application claims priority to and the benefit of Korean Patent Application No. 10-2016-0043672, filed on Apr. 8, 2016, the disclosure of which is incorporated herein by reference in its entirety.

BACKGROUND

1. Field of the Invention

The present disclosure relates to a structure for forming a fluid path.

2. Discussion of Related Art

Generally, vehicle brake systems or various industrial facilities include valves for supplying specific gases, or for supplying hydraulic pressure to a device including hydraulic valves and the like which operate with fluid pressure. Complexity of fluid supply lines and pipelines is determined according to how these valves are disposed, and technology for making valves into a block as an assembly to facilitate inspection, maintenance, and replacement of the valves is being developed.

As one example, a typical valve block includes two fluid paths and the two fluid paths communicate with each other inside a body of the valve block. A single ball press insertion portion is provided at each of the two fluid paths, and, to manufacture a desired fluid path, a manufacturer of a fluid path may insert a single ball into each of the two fluid paths to block a flow of fluid.

Therefore, in the typical valve block, only a single fluid path may be formed at a single block due to a structure in which a single ball is pressed and inserted into the single fluid path, and thus there is a problem in which simplification of a fluid path is difficult and pipeline complexity is increased such that a size of the typical valve block is increased.

SUMMARY OF THE INVENTION

According to one aspect of the present disclosure, there is provided a structure for forming a fluid path, which includes a body configured with first and second fluid paths which communicate with each other, and a third fluid path which is provided at a position, at which the first and second fluid paths are connected to each other, and communicates with the first and second fluid paths, and includes one or more among a first ball which is able to be disposed in the first fluid path, a second ball which is able to be disposed in the second fluid path, and a third ball which is able to be disposed in the third fluid path, wherein a diameter of the first fluid path is greater than that of the second fluid path, and the second ball is able to be disposed in the second fluid path by passing the first fluid path.

At this point, the first fluid path may be provided with a first opening located at a surface of the body, and a second opening located at a position at which the first fluid path is connected to the second fluid path, and a first stepped portion configured to restrict a movement position of the first ball may be formed between the first opening and the second opening.

At this point, a diameter of the first opening may be greater than that of the second opening.

At this point, the second fluid path may be provided with a fourth opening located at a surface of the body, and a third opening located at a position at which the second fluid path is connected to the first fluid path, and a second stepped portion configured to restrict a movement position of the second ball may be formed between the third opening and the fourth opening.

At this point, a diameter of the third opening may be greater than that of the fourth opening.

At this point, the third fluid path may be provided with a fifth opening located at a surface of the body, and a sixth opening located at a position at which the third fluid path is connected to the first fluid path and the second fluid path, and a third stepped portion configured to restrict a movement position of the third ball may be formed between the fifth opening and the sixth opening.

At this point, a diameter of the fifth opening may be greater than that of the sixth opening.

At this point, a diameter of the third fluid path may be less than that of the second fluid path.

At this point, the first fluid path and the second fluid path may be linearly disposed.

At this point, the third fluid path may be disposed to be perpendicular to the first fluid path and the second fluid path at the same plane.

At this point, the structure may further include a fourth fluid path communicating with one among the first to third fluid paths, and a fourth ball which is able to be disposed in the fourth fluid path.

At this point, an insertion opening may be formed at an entrance of each of the first fluid path and the third fluid path on the surface of the body, and may have a diameter that is greater than that of each of the first fluid path and the third fluid path.

At this point, the body may be configured in a form of a rectangular parallelepiped shape or a polygonal shape.

At this point, the body may be formed with a valve block.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
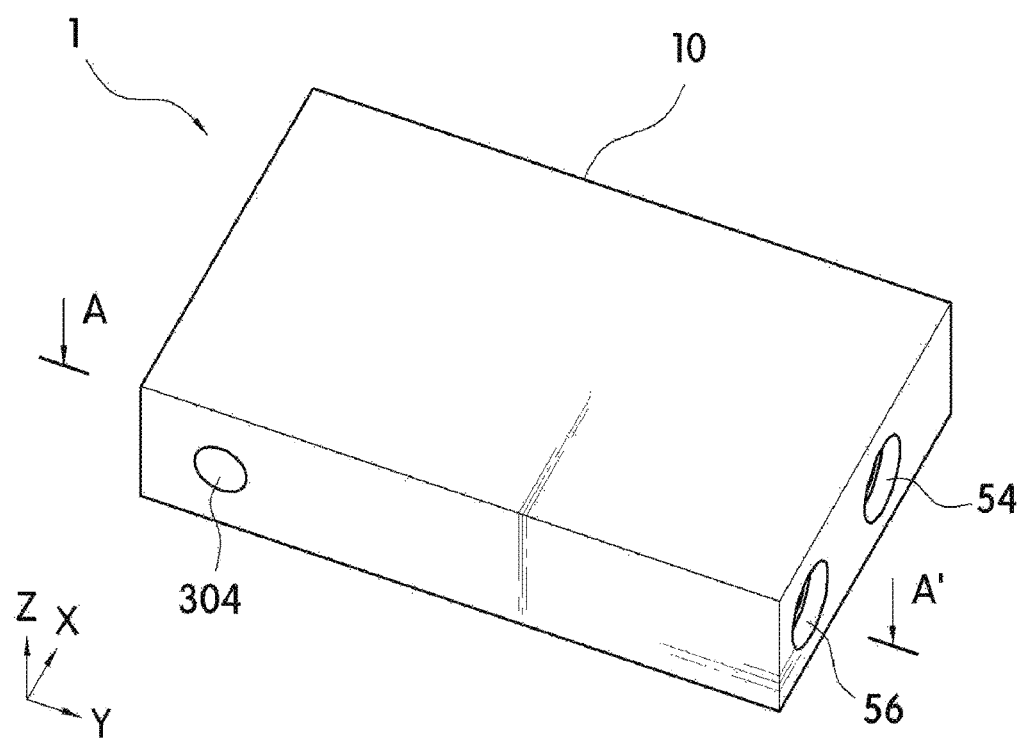
FIG. 1 is a perspective view of a structure for forming a fluid path according to one embodiment of the present disclosure.

Hereinafter, embodiments of the present disclosure will be fully described in a detail which is suitable for implementation by those skilled in the art with reference to the accompanying drawings. The present disclosure may be implemented in various different forms, and thus it is not limited to embodiments to be described herein. In the drawings, some portions not related to the description will be omitted and not be shown in order to clearly describe the present disclosure, and the same reference numerals are given to the same or similar components throughout the disclosure.

Figure 2:
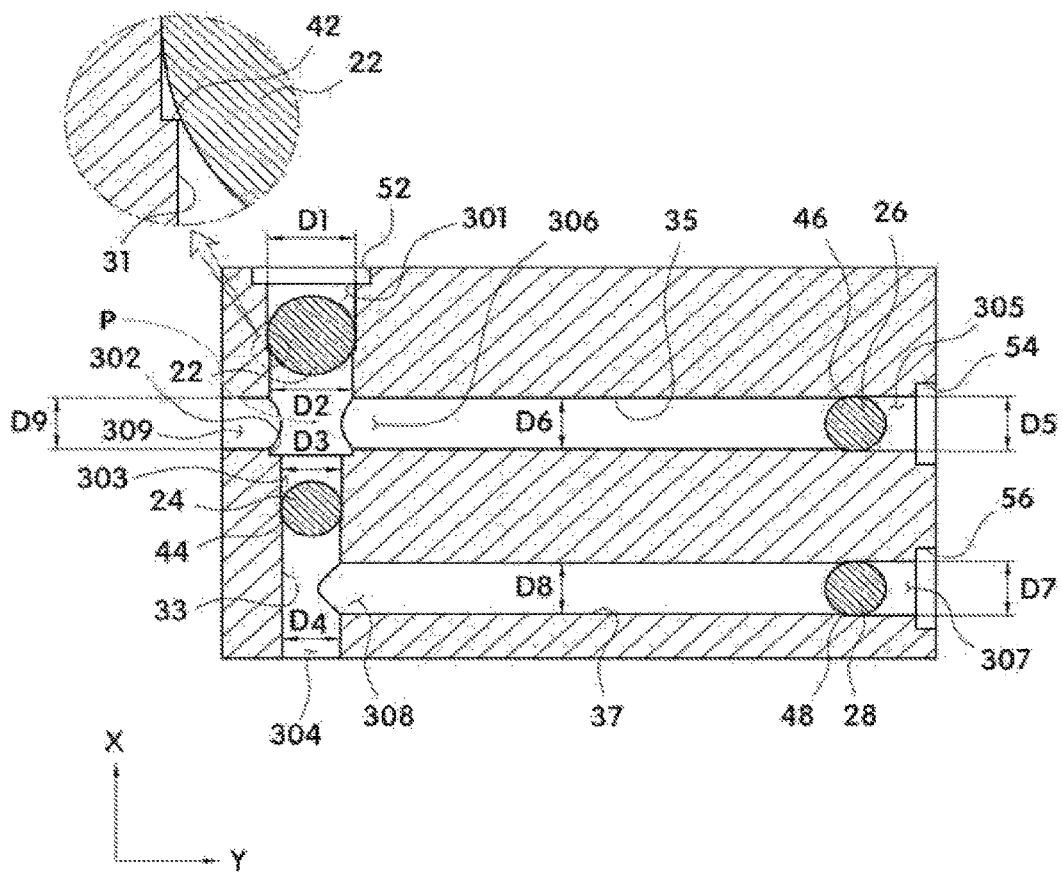
FIG. 2 is a cross-sectional view taken along A-A' line of FIG. 1.
Figure 3:
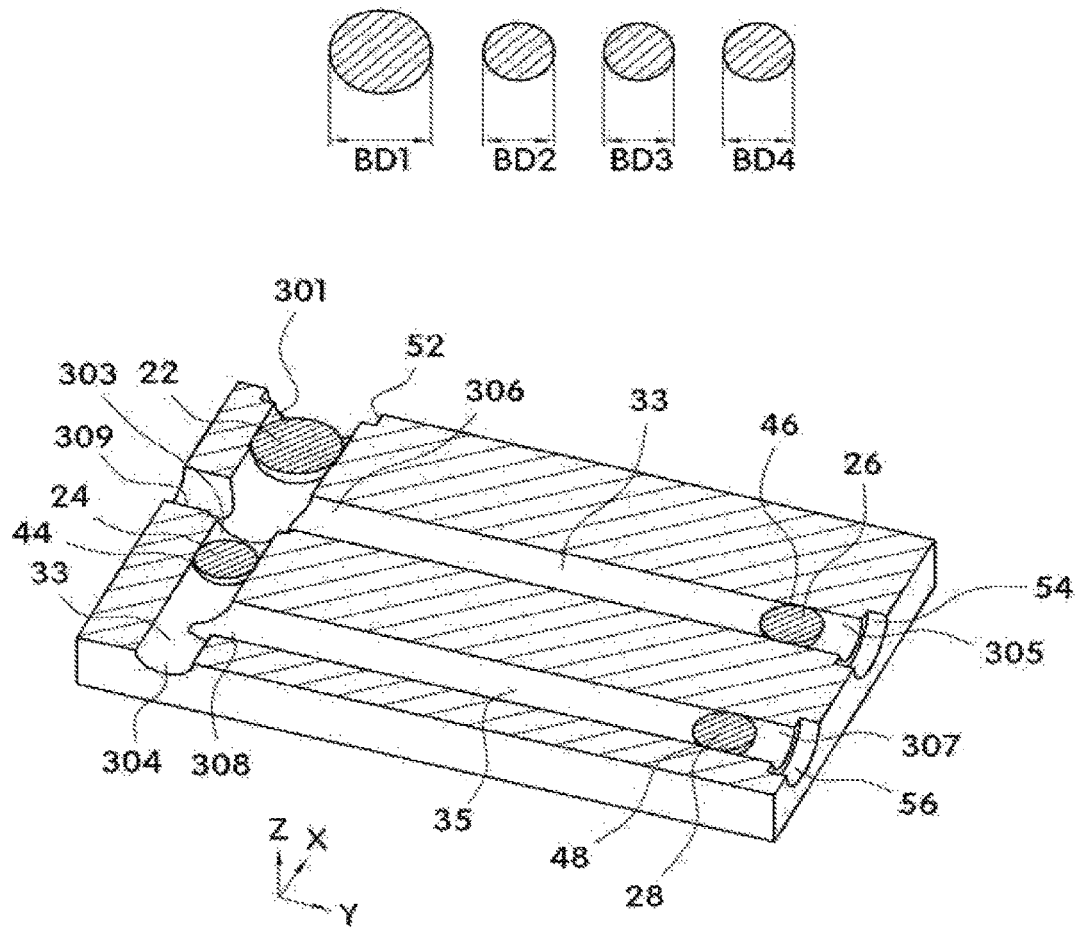
FIG. 3 is a perspective view of the cross-sectional view taken along A-A' line of FIG. 1.

FIG. 1 is a perspective view of a structure for forming a fluid path according to one embodiment of the present disclosure, FIG. 2 is a cross-sectional view taken along A-A' line of FIG. 1, and FIG. 3 is a perspective view of the cross-sectional view taken along A-A' line of FIG. 1.

Referring to FIGS. 1 to 3, a structure 1 for forming a fluid path according to one embodiment of the present disclosure includes a body 10, one or more fluid paths 31, 33, 35, and 37 which are formed inside the body 10, and one or more balls 22, 24, 26, and 28 which are able to be respectively disposed in the one or more fluid paths 31, 33, 35, and 37.

The body 10 of the structure 1 for forming a fluid path may be configured in the form of a block having a rectangular parallelepiped shape. As is described above, when the body 10 of the structure 1 for forming a fluid path is configured in the rectangular parallelepiped shape, the coupling to another structure for forming a fluid path, a pipeline in which a fluid path is formed, or the like may be easy. However, the form of the body 10 is not limited to the rectangular parallelepiped shape, and it may be configured in the form of a polygonal shape. As one example, the structure 1 for forming a fluid path, which has the rectangular parallelepiped shape, according to the present embodiment may form a valve block. Alternatively, the structure 1 for forming a fluid path according to an embodiment of the present disclosure may also be formed in various structures in addition to the valve block.

The body 10 may be made of rigid metal, for example, a steel material, and further it may be made of a stainless-steel material.

The one or more fluid paths 31, 33, 35, and 37 are formed inside the body 10 of the structure 1 for forming a fluid path. In the present embodiment, the one or more fluid paths 31, 33, 35, and 37, which are formed inside the body 10 of the structure 1 for forming a fluid path, include a first fluid path 31, a second fluid path 33, a third fluid path 35, and a fourth fluid path 37.

In one embodiment of the present disclosure, first to fourth balls 22, 24, 26, and 28 may be respectively fixed to the first to fourth fluid paths 31, 33, 35, and 37 by being inserted thereinto, or by being pressed and inserted thereinto.

Referring to FIGS. 2 and 3, when viewed from FIG. 2, the first fluid path 31 is located at a left side portion inside the body 10 of the structure 1 for forming a fluid path, and is formed with a pipe extending in an X-axis direction.

The first fluid path 31 is provided with a first opening 301 and a second opening 302, respectively, at both end portions of the first fluid path 31 to enable fluid to communicate through the first fluid path 31. The first opening 301 of the first fluid path 31 is located at one surface outside the body 10, and the second opening 302 of the first fluid path 31 is located inside the body 10.

In one embodiment of the present disclosure, a diameter D1 of the first opening 301, which is formed at an outside surface of the body 10, is formed to be greater than a diameter D2 of the second opening 302 located inside the body 10. At this point, a diameter of a pipe of the first fluid path 31 close to the first opening 301 may be formed to be the same as the diameter D1 of the first opening 301, and a diameter of a pipe of the first fluid path 31 close to the second opening 302 may be formed to be the same as the diameter D2 of the second opening 302.

A first stepped portion 42 is located at the middle of the first fluid path 31 between the first opening 301 and the second opening 302. The first stepped portion 42 is provided to restrict a movement of a first ball 22 which is able to be disposed inside the first fluid path 31. As shown in FIG. 2, the first stepped portion 42 may be provided such that a step is formed at a boundary with which a diameter is varied as the diameter of the pipe forming the first fluid path 31 is varied.

As one example, a height of a stepped portion inside the first fluid path 31 may have a half height of a difference between the diameter D1 of the first opening 301 and the diameter D2 of the second opening 302.

The first ball 22 is formed to have a diameter corresponding to the first opening 301 of the first fluid path 31, thereby being disposed in the first fluid path 31.

At this point, similar to the body 10, the first ball 22 may be formed with a steel material or a stainless-steel material.

Therefore, the first ball 22 may not move by passing the first stepped portion 42 formed at the first fluid path 31 in a state in which the first ball 22 is inserted inside the first opening 301, thereby blocking a flow of fluid in the first fluid path 31.

At this point, a position of the first ball 22, which is inserted inside the first fluid path 31 to block the first fluid path 31, may be varied according to a position of the first stepped portion 42. The position of the first stepped portion 42 may preferably be a position at which the first ball 22 may be insertable into the first fluid path 31 without protruding to an outward side of the body 10 in a state in which the first ball 22 is inserted into the first fluid path 31.

Meanwhile, a first insertion opening 52 is formed at one lateral surface of the body 10, at which the first opening 301 of the first fluid path 31 is formed. The first insertion opening 52 is formed with a circular depression having a diameter that is greater than that of the first opening 301.

In accordance with one embodiment of the present disclosure, the first ball 22 may be inserted inside the first fluid path 31 through the first insertion opening 52. In one embodiment of the present disclosure, an insertion opening serves to inform a position at which a user using the structure 1 for forming a fluid path may insert a ball into a fluid path of the structure 1 for forming a fluid path. In other words, an insertion opening may be formed to enable a ball, which is configured to block the fluid path, to be inserted into an opening at which the insertion opening is formed, thereby blocking the fluid path, but it may be formed to prevent the ball from being inserted into an opening at which the insertion opening is not formed.

Meanwhile, referring to FIG. 2, the second fluid path 33 is disposed at an extension line of the first fluid path 31. At this point, in accordance with one embodiment of the present disclosure, the second fluid path 33 is formed to linearly communicate with the first fluid path 31 at the same plane therewith.

The second fluid path 33 is provided with a third opening 303 and a fourth opening 304, respectively, at both end portions of the second fluid path 33 to communicate with the first fluid path 31. Referring to FIG. 2, the third opening 303 is formed inside the body 10 to come into contact with the second opening 302 of the first fluid path 31, and is formed to have a diameter D3 that is less than that of the second opening 302. The fourth opening 304 is formed at a lateral surface of the body 10 opposing the one lateral surface thereof at which the first opening 301 of the first fluid path 31 is formed, and is formed to have a diameter D4 that is less than that of the third opening 303.

Similar to the first fluid path 31, a second stepped portion 44 is formed inside the second fluid path 33 according to a difference in diameter between the third opening 303 and the fourth opening 304. At this point, the second stepped portion 44 restricts a movement of a second ball 24, which is insertable into the second fluid path 33, inside the second fluid path 33.

Referring to FIG. 2, a position of the second stepped portion 44 may be disposed to be close to the third opening 303 at a position at which the second ball 24 inserted into the second fluid path 33 may not protrude toward an outward side of the second fluid path 33.

A diameter BD2 of the second ball 24 inserted into the second fluid path 33 is formed to have a diameter that is less than that of the first ball 22, and is formed with the diameter corresponding to the third opening 303 of the second fluid path 33, thereby being able to be disposed in the second fluid path 33 to block the second fluid path 33.

In accordance with one embodiment of the present disclosure, the second ball 24 may be inserted into the second fluid path 33 after passing the first insertion opening 52 and then the first fluid path 31. Since the second ball 24 has the diameter BD2 that is greater than the diameter D4 of the fourth opening 304 of the second fluid path 33, it is formed not to be insertable inside the second fluid path 33 through the fourth opening 304.

Referring to FIG. 2, the first fluid path 31 and the second fluid path 33, which are linearly connected to each other, communicate with the third fluid path 35. When viewed from FIGS. 1 and 2, the third fluid path 35 extends in a Y-axis direction. When viewed from FIG. 2, the third fluid path 35 passes through from a right side surface of the body 10 to a left side surface thereof. Therefore, the first to third fluid paths 31, 33, and 35 may intersect with one another in the form of a cross shape.

Meanwhile, in accordance with one embodiment of the present disclosure, an intersecting position P, at which the third fluid path 35 communicates with the first fluid path 31 and the second fluid path 33, may be formed between the first stepped portion 42 of the first fluid path 31 and the second stepped portion 44 of the second fluid path 33. As is described above, the third fluid path 35 communicates with the first fluid path 31 and the second fluid path 33 at the intersecting position P at which the first fluid path 31 and the second fluid path 33 are connected to each other, and is located between the first stepped portion 42 of the first fluid path 31 and the second stepped portion 44 of the second fluid path 33 such that various fluid paths may be formed according to whether which fluid paths among the first fluid path 31, the second fluid path 33, and the third fluid path 35 are blocked.

Referring to FIG. 2, the third fluid path 35 includes a fifth opening 305, a sixth opening 306, and a ninth opening 309. When viewed from FIG. 2, the fifth opening 305 of the third fluid path 35 is located at the right side surface of the body 10, and the ninth opening 309 of the third fluid path 35 is located at the left side surface of the body 10.

Further, the sixth opening 306 is located at a position close to the fifth opening 305 among positions which are located between the fifth opening 305 and the ninth opening 309, and communicate with the first and second fluid paths 31 and 33.

At this point, a diameter D5 of the fifth opening 305 may be greater than a diameter D6 of the sixth opening 306, and a diameter D9 of the ninth opening 309 may be the same as the diameter D6 of the sixth opening 306.

In particular, the diameter D6 of the sixth opening 306 may be preferable to be less than the diameter BD2 of the second ball 24 which is inserted into the second fluid path 33. When the diameter D6 of the sixth opening 306 is greater than the diameter BD2 of the second ball 24, the second ball 24 may move to the third fluid path 35 after passing the first fluid path 31 and before being inserted into the second fluid path 33.

Similar to the first and second fluid paths 31 and 33, a third stepped portion 46 is formed at a middle position of the third fluid path 35 between the fifth opening 305 and the sixth opening 306. The third stepped portion 46 restricts a movement of a third ball 26, which is insertable into the third fluid path 35, inside the third fluid path 35. At this point, similar to the first stepped portion 42, the third stepped portion 46 is formed according to a difference in diameter between the fifth opening 305 and the sixth opening 306.

Referring to FIG. 2, a position of the third stepped portion 46 may be disposed to be close to the fifth opening 305 at a position at which the third ball 26 inserted into the third fluid path 35 may not protrude toward the outward side of the body 10.

Meanwhile, the third ball 26 disposed in the third fluid path 35 has a diameter corresponding to the fifth opening 305 of the third fluid path 35. The third ball 26 may be disposed inside the third fluid path 35. A movement of the third ball 26 may be restricted by the third stepped portion 46 and thus the third fluid path 35 may be blocked by the third ball 26.

Meanwhile, a second insertion opening 54 is formed at the right side surface of the body 10, at which the fifth opening 305 of the third fluid path 35 is formed. The second insertion opening 54 is formed with a circular depression having a diameter that is greater than that of the fifth opening 305.

Therefore, the third ball 26 may be inserted inside the third fluid path 35 from the fifth opening 305 at which the second insertion opening 54 is formed. At this point, the diameter D9 of the ninth opening 309 of the third fluid path 35 is less than that of the fifth opening 305 so that the third ball 26 corresponding to the diameter D5 of the fifth opening 305 may be formed not to be disposed in the third fluid path 35 through the ninth opening 309.

Meanwhile, the structure 1 for forming a fluid path is provided with a fourth fluid path 37 which is in parallel with the third fluid path 35 and communicates with the second fluid path 33.

Referring to FIGS. 2 and 3, the fourth fluid path 37 includes a seventh opening 307 and an eighth opening 308. When viewed from FIG. 2, the seventh opening 307 of the fourth fluid path 37 is located at the right side surface of the body 10, and the eighth opening 308 is located at a position that is close to the second fluid path 33 inside the body 10.

At this point, a diameter of the seventh opening 307 is formed to be greater than that of the eighth opening 308.

In accordance with one embodiment of the present disclosure, a fourth stepped portion 48 is located between the seventh opening 307 and the eighth opening 308. The fourth stepped portion 48 is configured such that a protruding bump is formed toward an inner side of the fourth fluid path 37, and serves to restrict a movement of a fourth ball 28.

Referring to FIG. 2, a position of the fourth stepped portion 48 may be disposed to be close to the seventh opening 307 at a position at which the fourth ball 28 inserted into the fourth fluid path 37 may not protrude toward the outward side of the body 10.

At this point, the fourth ball 28, which is insertable and fixable inside the fourth fluid path 37, is formed to have a diameter corresponding to that of the seventh opening 307 of the fourth fluid path 37.

A third insertion opening 56 is formed at the right side surface of the body 10, at which the seventh opening 307 of the fourth fluid path 37 is formed, when viewed from FIG. 2. Referring to FIG. 2, the third insertion opening 56 is formed with a circular depression having a diameter that is greater than that of the seventh opening 307. Therefore, the fourth ball 28 may be inserted from the seventh opening 307 at which the third insertion opening 56 is formed.

Referring to FIGS. 2 and 3, the fourth fluid path 37 communicates with the second fluid path 33. In accordance with one embodiment of the present disclosure, the fourth fluid path 37 is formed to be perpendicular to the second fluid path 33, but it is not limited that the fourth fluid path 37 should be perpendicular to the second fluid path 33. A position, at which the fourth fluid path 37 and the second fluid path 33 communicate with each other, may be between the second stepped portion 44 of the second fluid path 33 and the fourth opening 304 thereof.

In accordance with one embodiment of the present disclosure, the first to fourth fluid paths 31, 33, 35, and 37 are configured to be disposed at the same plane, but it is not necessary that the third fluid path 35 and the fourth fluid path 37, which respectively communicate with the first and second fluid paths 31 and 33, should be disposed at the same plane.

An operation and a usage method of the structure 1 for forming a fluid path, which has the above described configuration, according to one embodiment of the present disclosure will be described.

In the structure 1 for forming a fluid path according to one embodiment of the present disclosure, each of the first, fourth, fifth, seventh, and ninth openings 301, 304, 305, 307, and 309, which is located at an outer side surface of the body 10, may serve as an inlet or an outlet of fluid.

At this point, in the structure 1 for forming a fluid path according to one embodiment of the present disclosure, various fluid path directions may be formed by inserting the first to fourth balls 22, 24, 26, and 28 into corresponding fluid paths, which are desired to be blocked, among the first to fourth fluid paths 31, 33, 35, and 37.

In accordance with one embodiment of the present disclosure, when the first fluid path 31, the third fluid path 35, and the fourth fluid path 37 are desired to be blocked, the first ball 22, the third ball 26, and the fourth ball 28 may be respectively inserted into the first opening 301, the fifth opening 305, and the seventh opening 307, thereby blocking the first fluid path 31, the third fluid path 35, and the fourth fluid path 37.

At this point, when only the first fluid path 31 is desired to be blocked without blocking the second fluid path 33 using the second ball 24, the first ball 22 may be inserted into the first opening 301, thereby blocking the first fluid path 31.

When the second fluid path 33 is desired to be blocked using the second ball 24 and at the same time the first fluid path 31 is desired to be blocked using the first ball 22, the second ball 24 may be first inserted into the second fluid path 33 through the first fluid path 31 to block the second fluid path 33 and then the first ball 22 may be inserted into the first opening 301, thereby blocking the first fluid path 31.

At this point, when the first to fourth balls 22, 24, 26, and 28 are desired to be respectively inserted into the fluid paths of the structure 1 for forming a fluid path, they may be inserted into the fluid paths only through openings at which insertion openings are formed, and may not be inserted into the fluid paths through openings at which insertion openings are not formed.

Figure 4:
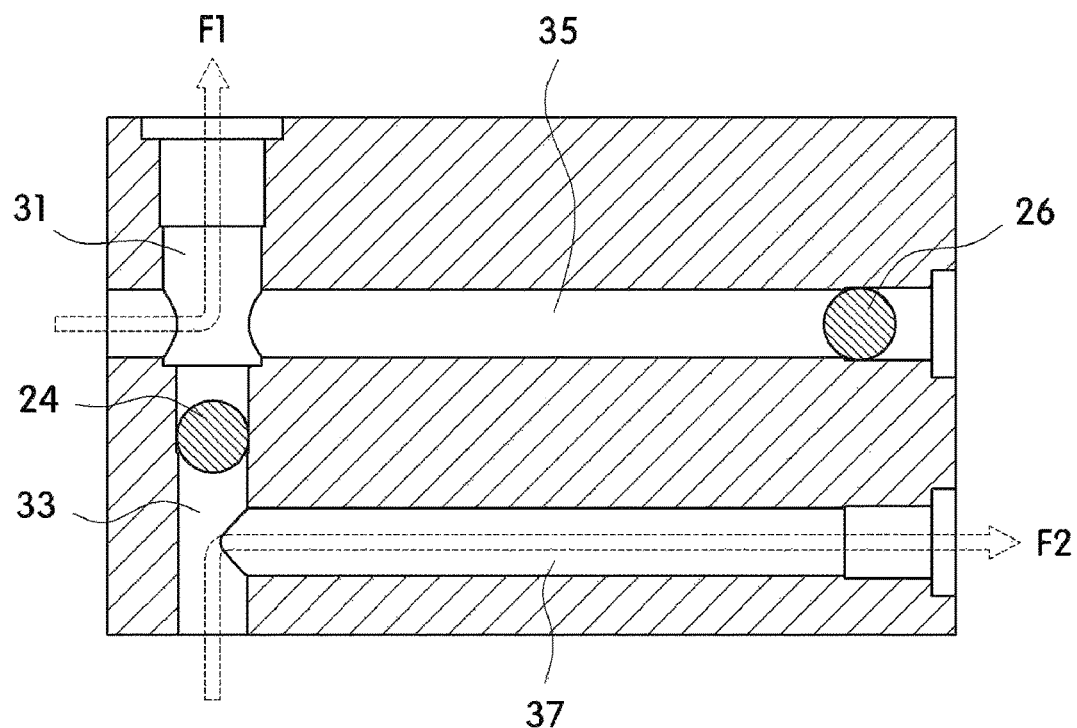
FIG. 4 is a first usage example in which two fluid paths are configured using a single structure for a fluid path according to one embodiment of the present disclosure.
Figure 5:
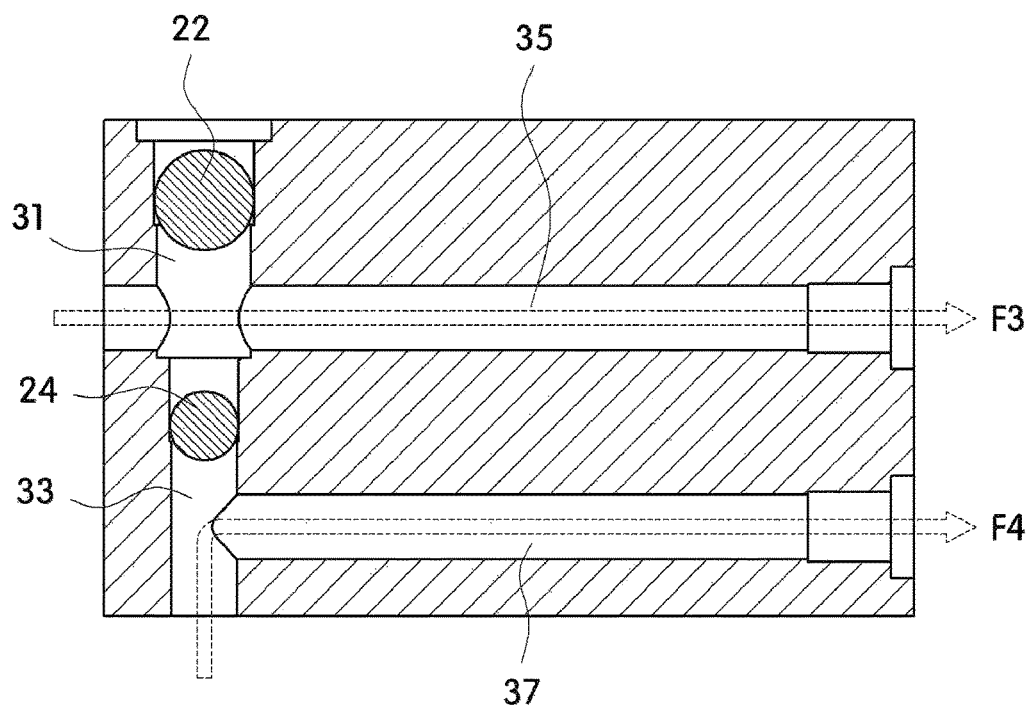
FIG. 5 is a second usage example in which two fluid paths are configured using a single structure for a fluid path according to one embodiment of the present disclosure.

Each of FIGS. 4 and 5 illustrates a usage example of a structure for forming a fluid path, in which different fluid paths are formed using two balls.

Referring to FIGS. 4 and 5, two independent fluid paths may be configured using the structure 1 for forming a fluid path according to one embodiment of the present disclosure.

In FIG. 4, two independent fluid paths F1 and F2 are formed inside the structure 1 for forming a fluid path by inserting and fixing the second ball 24 into and to the second fluid path 33 and by fixing the third ball 26 to the third fluid path 35.

In FIG. 5, two independent fluid paths F3 and F4 are formed inside the structure 1 for forming a fluid path by inserting and fixing the first ball 22 into and to the first fluid path 31 and by fixing the second ball 24 to the second fluid path 33.

In each of FIGS. 4 and 5, it has been exemplified that two independent fluid paths are formed by respectively locating two balls at fluid paths, but to form various fluid paths as necessary, one to three balls may be disposed at a structure for forming a fluid path.

However, when two independent fluid paths are desired to be configured in the structure 1 for forming a fluid path according to one embodiment of the present disclosure, the second ball 24 needs to be disposed in the second fluid path 33, and, in this case, the two independent fluid paths may be configured through the two method which are described with reference to FIGS. 4 and 5.

In a typical structure for forming a fluid path, when two balls are inserted into and fixed to fluid paths intersecting with each other in the form of a cross shape, only a single fluid path is configured so that, to form two independent fluid paths, two structures for forming a fluid path should be connected to each other.

Therefore, using the structure 1 for forming a fluid path according to one embodiment of the present disclosure, a plurality of fluid paths may be configured using fewer structures for forming a fluid path such that the manufacturing of a more simplified fluid system may be possible, costs may be reduced as the number of structures for forming a fluid path is decreased, and the maintenance and component replacement of the fluid system may be convenient.

In accordance with the structure for forming a fluid path according to one embodiment of the present disclosure, one or more fluid paths may be configured with a single structure for forming a fluid path by inserting one or more balls or by pressing and inserting one or more balls into a single fluid path so that simplification of a fluid path may be possible and a size of the structure for forming a fluid path may be reduced.

In accordance with the structure for forming a fluid path according to one embodiment of the present disclosure, fluid paths having different diameters may be configured to be linearly disposed and blocked by pressing and inserting balls having different sizes into the fluid paths such that various fluid paths may be formed using the fluid paths which are linearly disposed.

In accordance with the structure for forming a fluid path according to one embodiment of the present disclosure, a stepped portion may be formed at a position into which each of balls is inserted such that each of the balls may be stably fixed.

In accordance with the structure for forming a fluid path according to one embodiment of the present disclosure, a plurality of openings which are respectively provided at a plurality of fluid paths may be discriminated from one another on the basis of a diameter of each of the plurality of openings so that an opening into which a ball is inserted may be easily discriminated among the plurality of openings.

The structure for forming a fluid path according to one embodiment of the present disclosure may be configured in the form of a rectangular parallelepiped shape or a polygonal shape so that it is advantageous to connect a plurality of structures for forming a fluid path to one another.

Hereinbefore, although one embodiment of the present disclosure has been described, the spirit of the present disclosure is not limited to the embodiment disclosed herein, and it should be understood that numerous other embodiments can be devised by those skilled in the art that will fall within the same spirit and scope of this disclosure through addition, modification, deletion, supplement, and the like of a component, and also these other embodiments will fall within the spirit and scope of the present disclosure.

DESCRIPTION OF REFERENCE NUMERALS

1: structure for forming a fluid path
10: body
42, 44, 46, and 48: first to fourth stepped portions
22, 24, 26, and 28: first to fourth balls
52, 54, and 56: first to third insertion openings
31, 33, 35, and 37: first to fourth fluid paths
301 to 309: first to ninth openings

What is claimed is:

1. A structure for forming a fluid path, comprising:
a body configured with first and second fluid paths which communicate with each other, and a third fluid path which is provided at a position, at which the first and second fluid paths are directly connected to each other, and communicates with the first and second fluid paths; and
one or more among a first ball which is able to be disposed in the first fluid path, a second ball which is able to be disposed in the second fluid path, and a third ball which is able to be disposed in the third fluid path;
a fourth fluid path communicating with one among the first to third fluid paths; and
a fourth ball which is able to be disposed in the fourth fluid path,
wherein a diameter of the first fluid path where the third fluid path is connected to the first fluid path is greater than that of the second fluid path where the third fluid path is connected to the second fluid path, and
the second ball is able to be disposed in the second fluid path by passing the first fluid path.

2. The structure of claim 1, wherein the first fluid path is provided with a first opening located at a surface of the body, and a second opening located at a position at which the first fluid path is connected to the second fluid path, and
a first stepped portion configured to restrict a movement position of the first ball is formed between the first opening and the second opening.

3. The structure of claim 2, wherein a diameter of the first opening is greater than that of the second opening.

4. The structure of claim 1, wherein the second fluid path is provided with a fourth opening located at a surface of the body, and a third opening located at a position at which the second fluid path is connected to the first fluid path, and
a second stepped portion configured to restrict a movement position of the second ball is formed between the third opening and the fourth opening.

5. The structure of claim 4, wherein a diameter of the third opening is greater than that of the fourth opening.

6. The structure of claim 1, wherein the third fluid path is provided with a fifth opening located at a surface of the body, and a sixth opening located at a position at which the third fluid path is connected to the first fluid path and the second fluid path, and
a third stepped portion configured to restrict a movement position of the third ball is formed between the fifth opening and the sixth opening.

7. The structure of claim 6, wherein a diameter of the fifth opening is greater than that of the sixth opening.

8. The structure of claim 1, wherein a diameter of the third fluid path is less than that of the second fluid path.

9. The structure of claim 1, wherein the first fluid path and the second fluid path are linearly disposed.

10. The structure of claim 1, wherein the third fluid path is disposed to be perpendicular to the first fluid path and the second fluid path at the same plane.

11. The structure of claim 1, wherein an insertion opening is formed at an entrance of each of the first fluid path and the third fluid path on the surface of the body, and has a diameter that is greater than that of each of the first fluid path and the third fluid path.

12. The structure of claim 1, wherein the body is configured in a form of a rectangular parallelepiped shape or a polygonal shape.

13. The structure of claim 1, wherein the body is formed with a valve block.

* * * * *